Feb. 24, 1970 R. C. WRIGHT 3,497,673
TEMPERATURE CONTROL SYSTEM
Filed March 30, 1967
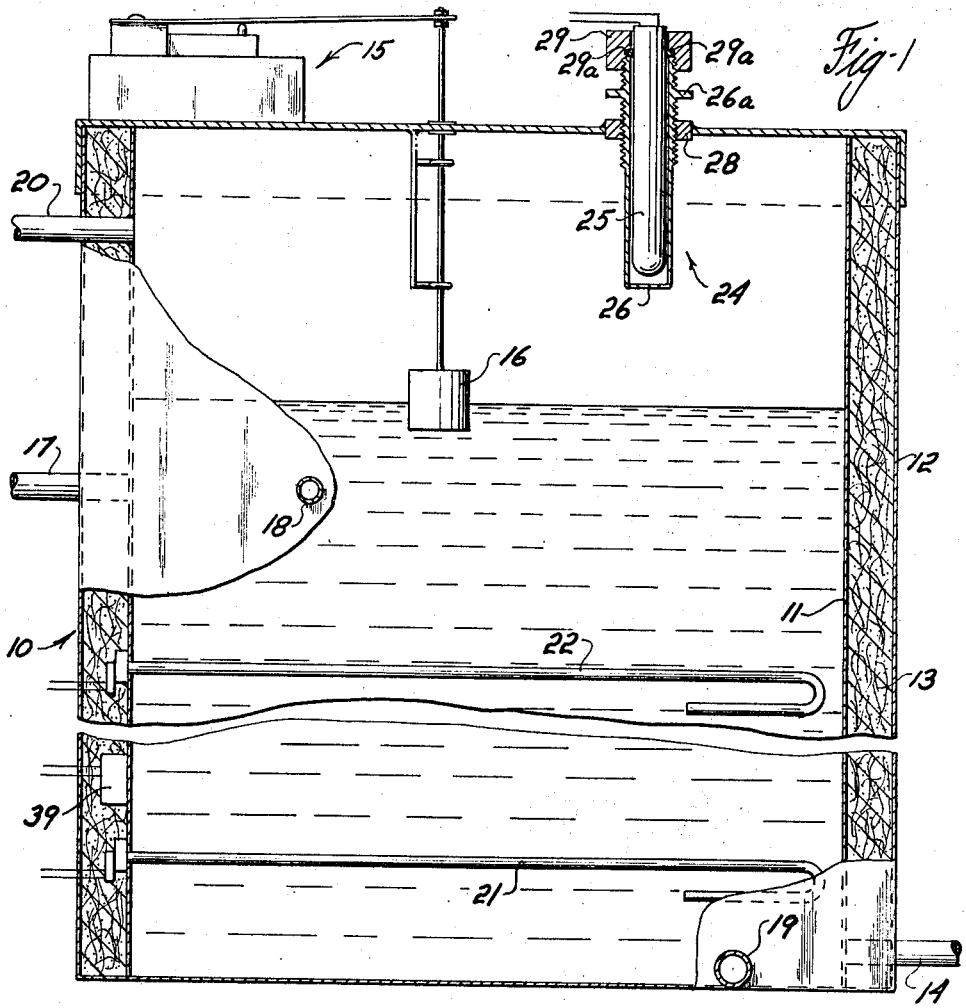
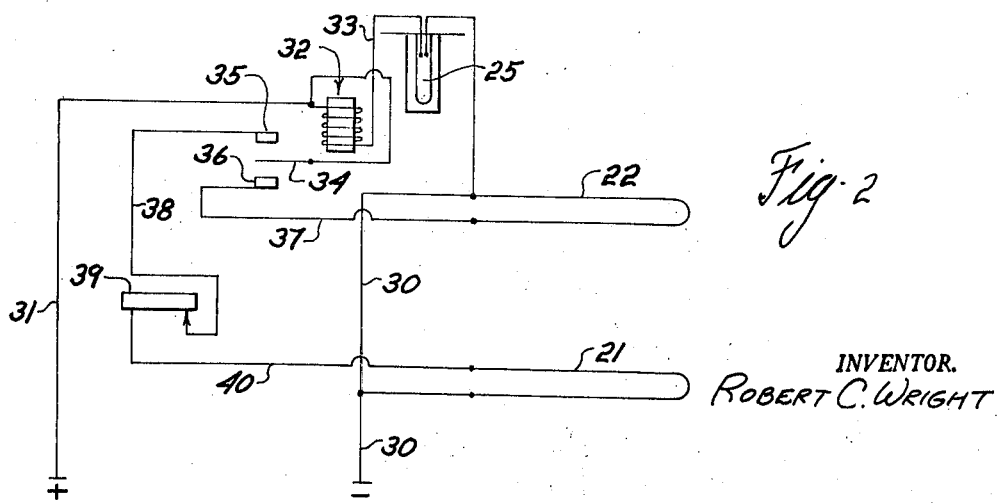
INVENTOR.
Robert C. Wright

United States Patent Office 3,497,673
Patented Feb. 24, 1970

3,497,673
TEMPERATURE CONTROL SYSTEM
Robert C. Wright, Huntingdon Valley, Pa., assignor, by mesne assignments, to Rudd Melikian, Inc., Warminster, Pa., a corporation of Pennsylvania
Filed Mar. 30, 1967, Ser. No. 627,150
Int. Cl. F24h 1/00; H05b 1/02
U.S. Cl. 219—328　　　　　　　　　　　　　　　　2 Claims

ABSTRACT OF THE DISCLOSURE

A temperature control system for a hot water reservoir of the type suitable for use in vending machine equipment. A vapor zone maintained at the top of the reservoir is provided with a mercury filled thermally responsive control element which is positioned within the vapor zone and is responsive to the temperature of the mixture of gases and vapors at the top of the reservoir. Heaters in the reservoir are controlled by a control circuit which interconnects them with the thermally responsive means. When two heaters are employed, the control circuit gives preference to the heater at the top of the reservoir, so that the water which is about to be drawn off is always at or near the dispensing temperature.

---

This invention relates to a control system for maintaining a fluid at a temperature very near its boiling point.

The invention is especially useful for regulating the temperature of hot water in coin operated vending machines of the type in which hot beverages such as coffee, tea, soups and hot chocolate are dispensed. The invention is concerned with the provision of a control system which will enable the delivery of adequate quantities of hot beverage forming liquid during peak demand periods.

The problem of water temperature control in such machines is a particularly important one because the water must be very near the boiling point to properly brew palatable beverages, but must not be boiling since a boiling liquid may scald the consumer and may impair the quality of the brewed beverage. In addition, the turbulence of a boiling liquid makes it difficult to meter with the accuracy necessary for consistent delivery of uniformly filled cupfuls of the beverage to the dispensing station.

Vending machine hot water control has conventionally been achieved by means of a thermostat immersed in the water supply. Other approaches have included the use of a thermostat in communication with a line containing the hottest water in the tank, as in my United States Patent No. 3,254,796, or the use of a thermostat mounted in heat transfer relationship with a vent line leading from a vapor space at the top of a tank. Surprisingly enough, I have found that placing the thermostat within a closed vapor space at the top of the hot water reservoir results in exceptional control and quick temperature recovery. In actual field tests, systems formed in accordance with the teachings of this invention will deliver three to four times as many cups of water at normal brewing temperatures of 210 to 180° F., as will any of the aforementioned prior art approaches.

An important feature of the invention lies in the provision of a control system which is extremely sensitive to temperature variations within a storage reservoir.

Another important feature of the control system of the present invention lies in the provision of a thermally sensitive element which will maintain the temperature of the liquid very near to, but not exceeding, its boiling point, despite differences in the atmospheric pressure in the various locations in which the units are placed.

Another important object of the invention is the provision of a temperature control system for a fluid supply reservoir which provides the reservoir with a rapid temperature recovery rate.

A still further object of the invention is the provision of a hot water control system which embodies the features of dependability, reliability and economy required of vending machine apparatus.

The foregoing and various other objects of the invention will become clearly apparent upon reference to the following detailed description of an illustrative embodiment of the invention and from the accompanying drawings in which:

FIGURE 1 illustrates, in schematic form, a reservoir embodying the control system of the present invention; and FIGURE 2 shows an illustrative control circuit capable of carrying out the invention.

A reservoir 10, embodying the control system of the present invention, is shown in FIGURE 1 and includes inner and outer sheet box-like steel enclosures 11 and 12 between which a layer of insulating material 13 is packed. The reservoir is provided with an inlet line 14 in which is mounted a solenoid operated valve (not shown) which is energizable to allow water under line pressure to be delivered to the tank.

A switch 15 is controlled by a float 16 which floats in the water in the tank or reservoir 10. The float opens the switch when the water reaches a predetermined level and closes the switch whenever the water drops below that level or a second preselected level below the maximum water level. Suitable circuitry, not shown, interconnects the switch 15 with the valve in the input line 14, in order to control the opening and closing of the valve, thereby maintaining the water level in the tank at the desired level.

An output line 17 leads from the tank at a point near the top, just below the water level. Line 17 leads to various beverage forming stations at which, for example, tea, hot chocolate or soup are prepared. A separate line 18 leads from the tank to equipment for brewing coffee. Although lines 17 and 18 could be located at various positions, I prefer that lines 17 and 18 lead from a point near the top of the reservoir so that the hottest water is always drawn off first.

As is customary with equipment of this type, a suitable drain line 19 is positioned near the bottom of the tank and an overflow line is located well above the water line as indicated at 20.

The reservoir 10 is further provided with heating means which typically include an electrically operated immersion type heater element 21 located near the bottom of the tank as shown in FIGURE 1. In cases where an unusually quick response is desired so that water will be available soon after the vending machine is turned on, or after an unusually heavy draw, a second heater 22 is provided in the upper portion of the tank.

The heaters are operated by the control system which will be described presently. Briefly stated, however, when two heaters are used, they are operated by the control system so that the top heater is always given preference, that is, heat will not be delivered to the water at the bottom of the tank until the heater at the top of the tank has raised the water there to the desired dispensing temperature.

To control the operation of the heating means, I provide a thermally sensitive controller, generally indicated at 24 and located in the vapor zone between the roof of the tank and the body of water. The thermally sensitive controller 24 preferably includes a mercury thermostat 25 which is adapted to fit within a well 26 formed of copper, brass or other heat conductive material. As is shown in FIGURE 1, the upper portion of well 26 is threaded and these threads cooperate with the internal threads of a sleeve 28 welded or otherwise secured to the top of the tank. A hex driver 26a is provided on the well 26 so that it may be adjusted up and down in order to vary the position of the thermostat with respect to the vapor zone. Preferably the thermostat itself is adjustably mounted within the well 26. For this purpose, a clamping nut 29, having a clamping ring 29a which is formed of a compressible material is adapted to be threaded onto the upper threaded portion of well 26. Tightening of the clamping nut squeezes the ring 29a into engagement with the wall of thermostat 25. When the nut is loosened, the height of the thermostat can be adjusted as desired.

Mercury thermostat 25 is of a well known type in which a charge of mercury encapsulated in a tube makes or breaks a pair of switch contacts as it expands or contracts. Preferably, thermostat 25 is selected to operate at a temperature of about 210° F. A mercury thermostat well suited for the purposes of this invention is one manufactured by Philadelphia Scientific Glass Company, Inc., of Philadelphia, Pa. The temperature differential of this thermostat is 2° F. at 210° F.

One terminal of each of heaters 21 and 22 is connected to one side of a power supply by means of a line 30. The second terminal of one or the other of the heaters is connected to the other line 31 of the power supply by the following means.

A control relay 32 is connected to the line 31 and to one lead 33 of the thermostat 25, the other lead of the thermostat being connected to line 30. Relay 32 is provided with a blade or arm 34 which is movable for alternative engagement with a contact 35 or a contact 36. Contact 36 communicates with heater 22 via a lead 37. A lead 38 interconnects contact 35 and a thermostat 39 which is sensitive to the water temperature in the lower portion of the tank. A lead 40 connects thermostat 39 to the heater 21. Although various other types of thermostats may be employed, thermostat 39 is preferably of the snap disc type. According to the invention, the thermally responsive disc is mounted in heat transfer relationship with the inner lining of the reservoir.

Thermostat 39 is selected to respond at a temperature somewhat lower than thermostat 25. This is only because the temperature gradient across the inner and outer surface of the lining 11 is much greater than the temperature gradient between thermostat 25 and the surface of the liquid. In actuality, the two thermostats should respond at temperatures which correspond to the same water temperature.

Reference is now made to FIGURE 2 for a description of a control circuit used in carrying out the principles of my invention.

In the circuit shown in FIGURE 2, control for two heaters is provided. The circuit operates as follows. When thermostat 25 is not calling for heat and thermostat 39 is calling for heat, arm 34 is in contact with the contactor member 35 and a circuit will be completed to the heater 21 by means of line 31, arm 34, contact 35, line 38, the thermostat 39, line 40 through the heater to the line 30. Assuming thermostat 39 does not call for heat, thermostat 39 will permit de-energization of heater 21. When the water nearest the thermostat reaches its dispensing temperature, the thermostat opens its contacts and thereby shuts off the heater 21.

Regardless of the operational state of thermostat 39, whenever thermostat 25 calls for heat, relay 32 will switch the contact arm 34, breaking contact with contact 35 and making a contact with contact 36. In this manner, heater 21 will be disconnected from the power supply and a circuit will be made to the heater 22 from the power supply. This heater will thereafter heat the water at the top of the tank in preference to the demands of the thermostat 39 at the bottom of the tank. Thus, the water which is to be drawn off first will always be the first to be heated resulting in a much quicker recovery time and delivery of uniformly heated cups of beverage to the consumer.

As noted above, thermostat 25 calls for heat whenever the temperature of the vapors reaches a level of about 200° F. Although the mixture at the top of the tank may be considered to be a saturated one, I have found that the oxygen and other contaminates ordinarily present in the mixture of vapor, moisture and gas at the top of the tank results in a heat differential of about 5° between the water temperature at the top of the tank and the atmosphere immediately surrounding the mercury thermostat. Because of this, it is preferable to use a thermostat which responds at a temperature somewhat below the boiling point, i.e. about 200° F. Another important reason exists for using a thermostat which is set to respond at the temperature of about 200° F. Such a thermostat can be used regardless of the location of the reservoir since even at altitudes of 5,000 or more feet, excessive boiling will be prevented.

In situations where it is desirable to use the single heater, it is generally preferred to locate that heater at the bottom of the tank since the normal stratification of the water will result in the coolest water being located at that point. If this is done, the mercury thermostat 25 and relay 32 should be connected so that the relay controlled switch and the thermostat are in series connection with the bottom heater 21.

An important feature of the invention lies in the provision of the mercury thermostat in the vapor zone at the top of the tank. I have found that with the thermostat so positioned, a much quicker response is possible than is the case when the thermostat is positioned so that it is immersed in the water. In addition, the same installation can be used to control the water temperature regardless of atmospheric pressure at the location where the vending machine is intended to be used. One important feature of the invention lies in the provision of the adjustable mount for the thermostat 25. By means of the threaded nut and body portions, the thermostat may be adjusted axially of the well 26. By moving the thermostat axially, the cooling effect of the ambient atmosphere can be varied, thus varying the water temperature at which the thermostat will respond. The arrangement is simple and dependable and has been proven to be extremely efficient, especially in cases where heavy demand is expected.

I claim:

1. In a machine for vending hot beverages including a substantially enclosed chamber within which a beverage forming liquid is heated and having means for heating the liquid within the chamber, said chamber further having an outlet conduit connected thereto for delivering quantities of said heated liquid in response to varying demand and liquid level control means for maintaining said liquid level at a predetermined point below the top of said chamber, a control system for maintaining the liquid delivered through said outlet conduit at a substantially constant preselected temperature, said control system including temperature sensitive means positioned in said chamber above said liquid level, means interconnecting said temperature sensitive means and said heating means, said temperature sensitive means being operable to energize and to de-energize said heating means in response to predetermined temperature variations in the vapor below and above said preselected temperature, said temperature sensitive means including an adjustable well extending into said chamber above said liquid level, a temperature responsive member within said well and means for adjusting the axial position of said temperature responsive member within said well so that the vapor temperature at which the temperature responsive member will respond can be varied, said temperature responsive member always being above said level of liquid.

2. A control system according to claim 1 wherein said temperature sensing means is a mercury thermostat.

References Cited

UNITED STATES PATENTS

| | | |
|---|---|---|
| 1,698,596 | 1/1929 | Hynes. |
| 1,892,557 | 12/1932 | McCormick _____ 219—321 |
| 1,996,634 | 4/1935 | Vaughan _____ 219—330 |
| 2,012,101 | 8/1935 | Hynes _____ 219—328 XR |
| 2,037,993 | 4/1936 | Miller. |
| 2,480,470 | 8/1949 | Hulbert _____ 219—330 |
| 2,785,271 | 3/1957 | Baly _____ 219—328 |
| 3,103,575 | 9/1963 | Pecci _____ 219—330 XR |
| 3,254,796 | 6/1966 | Wright _____ 219—330 XR |
| 3,392,266 | 7/1968 | Stahler _____ 219—330 XR |

JOSEPH V. TRUHE, Primary Examiner

C. L. ALBRITTON, Assistant Examiner

U.S. Cl. X.R.

219—321, 330; 222—146